No. 666,939. Patented Jan. 29, 1901.
A. J. RUDOLPH.
MACHINE FOR FORMING BOTTLE NECKS.
(Application filed Nov. 21, 1898.)
(No Model.)
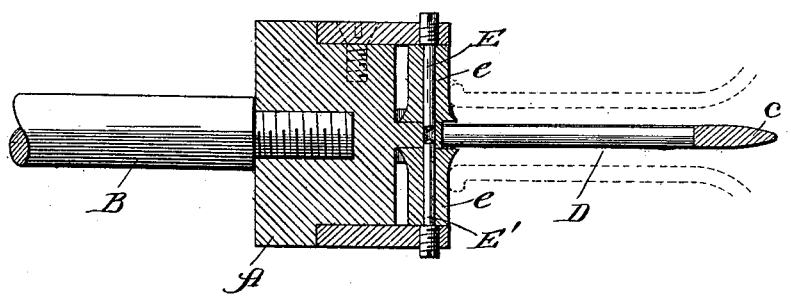
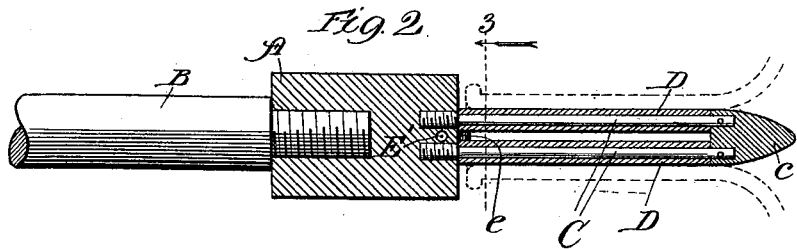
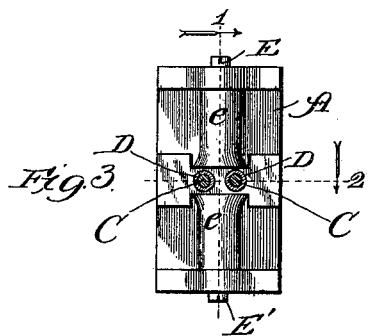
Witnesses:
Inventor:
Alexander J. Rudolph,

UNITED STATES PATENT OFFICE.

ALEXANDER J. RUDOLPH, OF CHICAGO, ILLINOIS.

MACHINE FOR FORMING BOTTLE-NECKS.

SPECIFICATION forming part of Letters Patent No. 666,939, dated January 29, 1901.

Application filed November 21, 1898. Serial No. 697,058. (No model.)

*To all whom it may concern:*

Be it known that I, ALEXANDER J. RUDOLPH, a citizen of the United States, residing at Chicago, in the county of Cook and State of Illinois, have invented certain new and useful Improvements in Machines for Forming Bottle-Necks, of which the following is a specification.

This invention relates to that class of machines which is used for the purpose of forming the necks of glass bottles while the bottles are in a heated or ductile condition, and particularly to the tool for forming the interior surface and lip.

The principal object of the invention is to provide a simple, economical, and efficient tool for use in forming the interior surface of the neck of a glass bottle and to assist in forming the lip thereof, and the invention consists in the features, combinations, and details of construction hereinafter described and claimed.

In the accompanying drawings, Figure 1 is a longitudinal sectional view of my improved tool, taken on line 1 of Fig. 3; Fig. 2, a similar view taken on line 2 of Fig. 3, and Fig. 3 a transverse sectional view taken on line 3 of Fig. 2.

In the art to which this invention relates it is well known that the interior and ends of the bottle-necks are formed by forcing a plug therein, rotating such plug, and rotating a shoulder or face on the plug or some part of the machine against the lip of the bottle-neck. The objection to this style of mechanism is that the material which forms the bottle-neck—usually glass in a ductile state—enters the seams, grain, or interstices of the metal and accumulates or destroys the interior surface of the bottle-neck and the lip thereof.

The principal object, therefore, of my invention is to provide a tool or plug which will remove these objections and which is adapted to be used in connection with a hand-tool or a machine that is automatic or semi-automatic in its nature, as will be more fully hereinafter described.

In constructing a tool in accordance with my improvements I make a block A of the desired size, shape, and strength to hold the operative parts and in some instances, especially when it is desirable to use it in connection with a machine, secure it to the spindle B of an operative machine. This block is preferably provided with two horizontal rods C, which extend from the front end thereof and which are connected together by means of a tapered plug c at the front ends thereof. To reduce the friction when forming the interior surface of the bottle-neck, these horizontal rods are provided with rotatable rolls D of cylindrical metal tubing, so that, as shown in Fig. 2, when the block is rotating the rolls spread, size, and finish the interior opening of the bottle-neck without destroying the surface. To form the lip of the bottle-neck, the block is further provided with two screw-pins or rods E and E', arranged transversely of the block and which form pivots upon which are mounted transverse rolls e, adapted to bear against the bottle-lip, as shown in Fig. 1, and form the same without destroying the surface thereof.

In illustrating and describing my invention I have illustrated and described only the plug portion used for the purpose of forming the interior surface of the bottle-neck and lip thereof and have left out of consideration other and well-known machine parts used for forming the outside of the bottle-neck, as such parts are well known to those skilled in the art.

While I have described my invention with more or less minuteness as regards form, specific uses, details of construction, and arrangement, I do not desire to be limited thereto unduly or any more than is pointed out in the claims. On the contrary, I contemplate all proper uses, changes in form, construction, and arrangement, the omission of immaterial elements, and the substitution of equivalents as circumstances may suggest or necessity render expedient.

I claim—

1. In a tool of the class described, the combination of two rolls radially arranged for forming the lip of a bottle-neck, two rolls longitudinally arranged to form the axial opening of a bottle-neck, and an arrow-head C to form a support for the longitudinal rolls and assist in opening the bottle-neck, substantially as described.

2. In a tool of the class described, the combination of two fixed parallel rods, a roll mounted on each rod and a plug having a flat body and a tapered end entered onto and secured to the outer end of both rods for the rods, rolls and plug to enter and be rotated within a bottle-neck and form the interior surface thereof, substantially as described.

3. In a tool of the class described, the combination of two fixed rods, a roll mounted on each rod, a plug tapered at its end and entered onto and secured to the outer end of both rods for the rods, rolls and plug to enter and be rotated within a bottle-neck and form the interior surface thereof, and rolls at right angles to the rod-rolls to engage the end face or lip of the bottle and form the same into shape, substantially as described.

4. In a tool of the class described, the combination of a rotatable head or block, two rods fixed in the head or block and projecting endwise therefrom, a roll rotatably mounted on each rod for the two rods and their rolls to enter and be rotated by the rotation of the block within the bottle-neck and form the interior surface thereof, and two rolls adjacent to the rod-rolls and rotatably mounted in the end face of the head or block to act and form the end face of the bottle-neck, substantially as described.

5. In a tool of the class described, the combination of a rotatable head or block, two rods fixed in the head or block and endwise projecting therefrom, a roll mounted on each rod for the two rods and their rolls to enter and be rotated by the rotation of the head or block within a bottle-neck and form the interior surface thereof, a roll on each side of the rods at right angles to the rod-rolls, and a spindle for each lateral roll, each spindle carried by the head or block to have the rolls project from the end face of the block and form the end of the bottle-neck, substantially as described.

ALEXANDER J. RUDOLPH.

Witnesses:
THOMAS C. McGREGOR,
THOMAS F. SHERIDAN.